United States Patent
Son

(10) Patent No.: US 11,635,584 B2
(45) Date of Patent: *Apr. 25, 2023

(54) OPTICAL IMAGING SYSTEM

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 216 days.

This patent is subject to a terminal disclaimer.

(21) Appl. No.: 17/077,194

(22) Filed: Oct. 22, 2020

(65) Prior Publication Data

US 2021/0041663 A1    Feb. 11, 2021

Related U.S. Application Data

(60) Continuation of application No. 16/376,152, filed on Apr. 5, 2019, now Pat. No. 10,852,507, which is a division of application No. 15/468,181, filed on Mar. 24, 2017, now Pat. No. 10,302,904.

(30) Foreign Application Priority Data

Dec. 20, 2016 (KR) .......................... 10-2016-0174950

(51) Int. Cl.
  *G02B 9/62* (2006.01)
  *G02B 13/00* (2006.01)
  *H04M 1/02* (2006.01)

(52) U.S. Cl.
  CPC .......... *G02B 9/62* (2013.01); *G02B 13/0045* (2013.01); *H04M 1/0264* (2013.01)

(58) Field of Classification Search
  None
  See application file for complete search history.

(56) References Cited

U.S. PATENT DOCUMENTS

| 8,867,149 B2 | 10/2014 | Hsu et al. |
| 9,019,626 B2 | 4/2015 | Hsieh et al. |
| 9,291,798 B2 | 3/2016 | Sekine |

(Continued)

FOREIGN PATENT DOCUMENTS

| CN | 202330843 U | 7/2012 |
| CN | 103597395 A | 2/2014 |

(Continued)

OTHER PUBLICATIONS

Chinese Office Action dated Dec. 27, 2021, in counterpart Chinese Patent Application No. 202110061487.4 (16 pages in English and 12 pages in Chinese).

(Continued)

*Primary Examiner* — Darryl J Collins
(74) *Attorney, Agent, or Firm* — NSIP Law

(57) ABSTRACT

An optical imaging system includes a first lens having a positive refractive power, a second lens having a negative refractive power, a third lens having a positive refractive power, a fourth lens having a positive refractive power, a fifth lens having a negative refractive power, and a sixth lens having a negative refractive power. The first to sixth lenses are sequentially disposed from an object side to an imaging plane. An Abbe number of the second lens is 21 or less.

3 Claims, 9 Drawing Sheets

(56) References Cited

U.S. PATENT DOCUMENTS

| | | | |
|---|---|---|---|
| 9,977,224 B2 | 5/2018 | Tang et al. | |
| 10,007,093 B2 | 6/2018 | Chen et al. | |
| 10,018,807 B2 * | 7/2018 | Tang | G02B 9/64 |
| 10,025,071 B2 | 7/2018 | Chen et al. | |
| 10,302,904 B2 | 5/2019 | Son | |
| 2012/0188654 A1 | 7/2012 | Huang | |
| 2013/0321934 A1 | 12/2013 | Minezaki et al. | |
| 2014/0071543 A1 | 3/2014 | Shinohara | |
| 2014/0098239 A1 | 4/2014 | Jeong et al. | |
| 2014/0111873 A1 | 4/2014 | Huang | |
| 2014/0254029 A1 | 9/2014 | Hsu et al. | |
| 2014/0320981 A1 | 10/2014 | Hsieh et al. | |
| 2014/0340568 A1 | 11/2014 | Sano et al. | |
| 2014/0354872 A1 | 12/2014 | Chen et al. | |
| 2014/0355134 A1 | 12/2014 | Sekine | |
| 2015/0109692 A1 | 4/2015 | Son | |
| 2015/0116570 A1 | 4/2015 | Tsai et al. | |
| 2015/0146092 A1 | 5/2015 | Chen | |
| 2015/0168677 A1 | 6/2015 | Lee et al. | |
| 2015/0241660 A1 | 8/2015 | Son | |
| 2015/0260961 A1 | 9/2015 | Ota et al. | |
| 2015/0260964 A1 | 9/2015 | Noda | |
| 2015/0370042 A1 | 12/2015 | Chen et al. | |
| 2016/0004038 A1 | 1/2016 | Huang | |
| 2016/0011405 A1 | 1/2016 | Shinohara et al. | |
| 2016/0033747 A1 | 2/2016 | Tang et al. | |
| 2016/0091691 A1 | 3/2016 | Son | |
| 2016/0116715 A1 | 4/2016 | Ota | |
| 2016/0124192 A1 | 5/2016 | Koreeda | |
| 2016/0139368 A1 | 5/2016 | You | |
| 2016/0161719 A1 | 6/2016 | Son | |
| 2016/0187620 A1 | 6/2016 | Huang | |
| 2016/0209627 A1 | 7/2016 | Seo et al. | |
| 2016/0216484 A1 | 7/2016 | Chen et al. | |
| 2017/0146811 A1 | 5/2017 | Son | |
| 2017/0322391 A1 | 11/2017 | Kang et al. | |
| 2018/0024322 A1 | 1/2018 | Chen et al. | |
| 2018/0045913 A1 | 2/2018 | Hsueh et al. | |
| 2018/0052303 A1 | 2/2018 | Tang et al. | |
| 2018/0059373 A1 | 3/2018 | Chen et al. | |
| 2019/0121060 A1 | 4/2019 | Shigemitsu et al. | |

FOREIGN PATENT DOCUMENTS

| | | |
|---|---|---|
| CN | 203606554 U | 5/2014 |
| CN | 104035186 A | 9/2014 |
| CN | 104122650 A | 10/2014 |
| CN | 203909381 U | 10/2014 |
| CN | 104570277 A | 4/2015 |
| CN | 104656228 A | 5/2015 |
| CN | 204462518 U | 7/2015 |
| CN | 104820276 A | 8/2015 |
| CN | 105204137 A | 12/2015 |
| CN | 105223677 A | 1/2016 |
| CN | 105319679 A | 2/2016 |
| CN | 105319688 A | 2/2016 |
| CN | 205067841 U | 3/2016 |
| CN | 105607224 A | 5/2016 |
| CN | 205210399 U | 5/2016 |
| CN | 105676419 A | 6/2016 |
| CN | 105717617 A | 6/2016 |
| CN | 106094177 A | 11/2016 |
| CN | 106154510 A | 11/2016 |
| CN | 106526789 A | 3/2017 |
| CN | 107632366 A | 1/2018 |
| CN | 107765394 A | 3/2018 |
| CN | 109477949 A | 3/2019 |
| JP | 2013-182090 A | 9/2013 |
| KR | 10-2014-0009210 A | 1/2014 |
| KR | 10-2015-0070858 A | 6/2015 |
| KR | 10-2016-0089743 A | 7/2016 |
| KR | 10-2016-0092980 A | 8/2016 |
| KR | 10-2016-0117998 A | 10/2016 |
| TW | 201624044 A | 7/2016 |
| WO | WO 2012/169778 A2 | 12/2012 |

OTHER PUBLICATIONS

Korean Office Action dated Dec. 21, 2021, in counterpart Korean Patent Application No. 10-2019-0023038 (8 pages in English and 4 pages in Korean).

Korean Office Action dated Apr. 18, 2018, in corresponding Korean Application No. 10-2016-0174950 (10 pages in English, 6 pages in Korean).

Chinese Office Action dated Nov. 28, 2019 in counterpart Chinese Patent Application No. 201710390903.9 (12 pages in English and 10 pages in Chinese).

Chinese Office Action dated Jul. 15, 2020 in counterpart Chinese Patent Application No. 201710390903.9 (12 pages in English and 9 pages in Chinese).

Chinese Office Action dated Jul. 13, 2022, in counterpart Chinese Patent Application No. 202110061487.4 (19 Pages in English, 14 Pages in Chinese).

* cited by examiner

|   | S1 | S2 | S3 | S4 | S5 | S6 | S7 | S8 | S9 | S10 | S11 | S12 |
|---|---|---|---|---|---|---|---|---|---|---|---|---|
| R | 1.791079 | 10.73797 | 117.3879 | 4.192585 | 3.500607 | 4.452661 | -30.8531 | -11.884 | 6.794857 | 4.307525 | 1.811101 | 1.554019 |
| K | -0.40593 | -0.3766 | 0.855903 | -4.91717 | 2.863648 | 0 | 0.271017 | -4.14622 | 8.617665 | -22.7678 | -4.48539 | -0.96732 |
| A | 0.000441 | -0.04495 | -0.01274 | 0.015594 | -0.08575 | -0.06192 | -0.04734 | -0.03298 | 0.024489 | -0.01283 | -0.18485 | -0.20377 |
| B | 0.01123 | 0.009593 | 0.088406 | 0.106684 | 0.048655 | 0.031453 | -0.02174 | -0.06355 | -0.10201 | -0.01772 | 0.061817 | 0.08014 |
| C | -0.04147 | 0.018379 | -0.14231 | -0.22089 | -0.14883 | -0.13707 | 0.036131 | 0.124205 | 0.081548 | 0.011492 | -0.01043 | -0.02485 |
| D | 0.061515 | -0.0489 | 0.72096 | 0.440048 | 0.207806 | 0.768131 | 0.00035 | -0.11817 | -0.04289 | -0.00458 | 0.00099 | 0.005479 |
| E | -0.05462 | 0.046125 | -0.2338 | -0.60408 | -0.13224 | -0.3147 | -0.06115 | 0.068126 | 0.013167 | 0.001029 | -4.55E-05 | -0.000079 |
| F | 0.023378 | -0.02184 | 0.142937 | 0.460604 | -0.07234 | 0.199939 | 0.065284 | -0.02079 | -0.00216 | -0.00012 | 2.16E-07 | 7.02E-05 |
| G | -0.00425 | 0.004008 | -0.03658 | -0.14149 | 0.166084 | -0.0463 | -0.02399 | 0.002522 | 0.000149 | 5.31E-06 | 3.92E-08 | -3.43E-06 |
| H | 0 | 0 | 0 | 0 | -0.06617 | 0 | 0.002686 | 0 | 0 | 0.00E+00 | 0.00E+00 | 7.04E-08 |

FIG. 3

| | S1 | S2 | S3 | S4 | S5 | S6 | S7 | S8 | S9 | S10 | S11 | S12 |
|---|---|---|---|---|---|---|---|---|---|---|---|---|
| R | 1.789327 | 10.84431 | 240.9604 | 4.318098 | 3.596579 | 4.568223 | -23.2767 | -10.4548 | 6.908057 | 4.52795 | 1.84686 | 1.544013 |
| K | -0.41893 | -0.37661 | 0.855903 | -4.40511 | 2.850935 | 0 | 0.271017 | -4.14622 | 8.431187 | -22.7678 | -4.07694 | -0.97437 |
| A | 0.000376 | -0.04717 | -0.01859 | 0.007911 | -0.08451 | -0.05999 | -0.04582 | -0.03276 | 0.026478 | -0.00632 | -0.18633 | -0.20337 |
| B | 0.013966 | 0.012959 | 0.122652 | 0.148279 | 0.016188 | 0.013179 | -0.03138 | -0.07046 | -0.10515 | -0.02773 | 0.060321 | 0.080177 |
| C | -0.05131 | 0.014944 | -0.22999 | -0.32748 | 0.049704 | -0.07781 | 0.055836 | 0.138825 | 0.083349 | 0.018183 | -0.00937 | -0.02487 |
| D | 0.080483 | -0.04383 | 0.37279 | 0.630128 | -0.40874 | 0.157801 | -0.01157 | -0.13434 | -0.04332 | -0.00717 | 0.003707 | 0.005483 |
| E | -0.07541 | 0.03707 | -0.39465 | -0.81425 | 0.962978 | -0.20099 | -0.07563 | 0.078281 | 0.01304 | 0.001605 | -8.02E-06 | -0.00079 |
| F | 0.034946 | -0.01469 | 0.234586 | 0.56688 | 1.20051 | 0.137618 | 0.093346 | -0.02403 | -0.00208 | -0.00018 | -2.26E-06 | 6.97E-05 |
| G | -0.00686 | 0.001899 | -0.05823 | -0.1726 | 0.790682 | -0.03147 | -0.04034 | 0.002918 | 0.000138 | 8.47E-06 | 1.05E-07 | -3.37E-06 |
| H | 0 | 0 | 0 | 0 | -0.20886 | 0 | 0.005994 | 0 | 0 | 0.00E+00 | 0.00E+00 | 6.85E-08 |

FIG. 6

| | S1 | S2 | S3 | S4 | S5 | S6 | S7 | S8 | S9 | S10 | S11 | S12 |
|---|---|---|---|---|---|---|---|---|---|---|---|---|
| R | 1.696692 | 9.395656 | -17.4231 | 7.05049 | 4.324709 | 5.869897 | -28.9448 | -22.876 | 104.5584 | 12.15869 | 2.400028 | 1.870837 |
| K | -0.40584 | -0.37663 | 0.999886 | 0.90024 | 0.992965 | 0 | 0.271017 | -4.14622 | 7.702874 | -22.7678 | -2.96758 | -1.01611 |
| A | 0.004261 | -0.04727 | 0.007084 | 0.022808 | -0.10251 | -0.05593 | -0.04472 | -0.02789 | 0.031312 | -0.01917 | -0.1725 | -0.14184 |
| B | 0.001361 | 0.012106 | 0.145404 | 0.132746 | 0.16608 | 0.01654 | -0.0431 | -0.09349 | -0.10011 | -0.01983 | 0.058317 | 0.048424 |
| C | -0.0034 | 0.055449 | -0.22141 | -0.10585 | -0.70274 | -0.06093 | 0.094061 | 0.173377 | 0.064083 | 0.014076 | -0.011 | -0.01319 |
| D | -0.00833 | -0.16651 | 0.224458 | -0.10991 | 1.891322 | 0.088192 | -0.08604 | -0.17121 | -0.02613 | -0.00571 | 0.001337 | 0.002597 |
| E | 0.013006 | 0.185306 | -0.13471 | 0.345046 | -3.32121 | -0.09756 | -0.00034 | 0.096772 | 0.004174 | 0.00131 | -0.0001 | -0.00032 |
| F | -0.0116 | -0.09784 | 0.054428 | -0.29485 | 3.477844 | 0.069312 | 0.046969 | -0.02778 | 0.000112 | -0.00016 | 4.79E-06 | 2.55E-05 |
| G | 0.002936 | 0.020171 | -0.01024 | 0.097515 | -1.96314 | -0.01548 | -0.02352 | 0.003092 | -4.23E-05 | 7.56E-06 | -9.86E-08 | -1.12E-06 |
| H | 0 | 0 | 0 | 0 | 0.462971 | 0 | 0.002619 | 0 | 0 | 0.00E+00 | 0.00E+00 | 2.10E-08 |

FIG. 9

OPTICAL IMAGING SYSTEM

CROSS-REFERENCE TO RELATED APPLICATION(S)

This application is a continuation of U.S. patent application Ser. No. 16/376,152 filed on Apr. 5, 2019, now U.S. Pat. No. 10,852,507 issued on Dec. 1, 2020, which is a divisional of U.S. patent application Ser. No. 15/468,181 filed on Mar. 24, 2017, now U.S. Pat. No. 10,302,904 issued on May 28, 2019, which claims benefit of priority under 35 U.S.C. § 119(a) to Korean Patent Application No. 10-2016-0174950 filed on Dec. 20, 2016, in the Korean Intellectual Property Office, the entire disclosures of which are incorporated herein by reference for all purposes.

BACKGROUND

1. Field

The present disclosure relates to an optical imaging system including six lenses.

2. Description of Related Art

Small camera modules may be mounted in mobile communications terminals. For example, small camera modules may be mounted in thin-width devices, such as mobile phones. Small camera modules include an optical imaging system including a small number of lenses and a small image sensor to allow for a thin width. For example, an optical imaging system in a small camera module may include four or less lenses and an image sensor having a size of 7 millimeters (mm) or less.

However, because such optical imaging systems include a small number of lenses and an image sensor having a small size, it may be difficult for the optical image sensor to be used in a small camera module having a low F number while maintaining high performance.

SUMMARY

This Summary is provided to introduce a selection of concepts, in simplified form, that are further described below in the Detailed Description. This Summary is not intended to identify key features or essential features of the claimed subject matter, nor is it intended to be used as an aid in determining the scope of the claimed subject matter.

According to an aspect of the present disclosure, an optical imaging system includes a first lens having a positive refractive power, a second lens having a negative refractive power, a third lens having a positive refractive power, a fourth lens having a positive refractive power, a fifth lens having a negative refractive power, and a sixth lens having a negative refractive power. The first to sixth lenses are sequentially disposed from an object side to an imaging plane. An Abbe number of the second lens is 21 or less.

The first lens of the optical imaging system may have a convex object-side surface along an optical axis and a concave image-side surface along the optical axis. The second lens of the optical imaging system can have a concave image-side surface along the optical axis. The third lens of the optical imaging system may have a convex object-side surface along the optical axis and a concave image-side surface along the optical axis.

The fourth lens of the optical imaging system can have a concave object-side surface along the optical axis and a convex image-side surface along the optical axis. The fifth lens of the optical imaging system may have a convex object-side surface along the optical axis and a concave image-side surface along the optical axis. One or more inflection points can be formed on at least one of an object-side surface and an image-side surface of the fifth lens. The sixth lens of the optical imaging system may have a convex object-side surface along the optical axis and a concave image-side surface along the optical axis. One or more inflection points can be formed on at least one of an object-side surface and an image-side surface of the sixth lens.

The optical imaging system can satisfy the expression S1S5/S1S11<0.365, where S1S5 represents a distance from an object-side surface of the first lens to an image-side surface of the third lens and S1S11 represents a distance from the object-side surface of the first lens to an image-side surface of the sixth lens. The optical imaging system may satisfy the expression R1/f<0.370, where R1 represents a radius of curvature of an object-side surface of the first lens and f represents an overall focal length of the optical imaging system along the optical axis.

The optical imaging system can satisfy the expression 30 mm<|f6|, where f6 represents a focal length of the sixth lens. The optical imaging system may satisfy the expression 7.0 mm<2ImgHT, where 2ImgHT represents a diagonal length of an imaging plane. The optical imaging system can have an F number of less than 2.1. The optical imaging system can also satisfy the expression TTL/2ImgHT<0.695, where TTL represents a distance from an object-side surface of a lens closest to the object side among the first to sixth lenses to an imaging plane and 2ImgHT again represents a diagonal length of the imaging plane.

In another general aspect, an optical imaging system includes lenses sequentially disposed from an object side to an imaging plane, satisfying the condition TTL/2ImgHT<0.695. In the expression, TTL represents a distance from an object-side surface of a lens closest to the object side among the plurality of lenses to an imaging plane and 2ImgHT represents a diagonal length of an imaging plane.

BRIEF DESCRIPTION OF DRAWINGS

The above and other aspects, features, and advantages of the present disclosure will be more clearly understood from the following detailed description taken in conjunction with the accompanying drawings, in which:

FIG. 3 is a table listing aspherical characteristics of the optical imaging system illustrated in FIG. 1;

FIG. 6 is a table listing aspherical characteristics of the optical imaging system illustrated in FIG. 4;

FIG. 9 is a table listing aspherical characteristics of the optical imaging system illustrated in FIG. 7.

DETAILED DESCRIPTION

Figure 1:
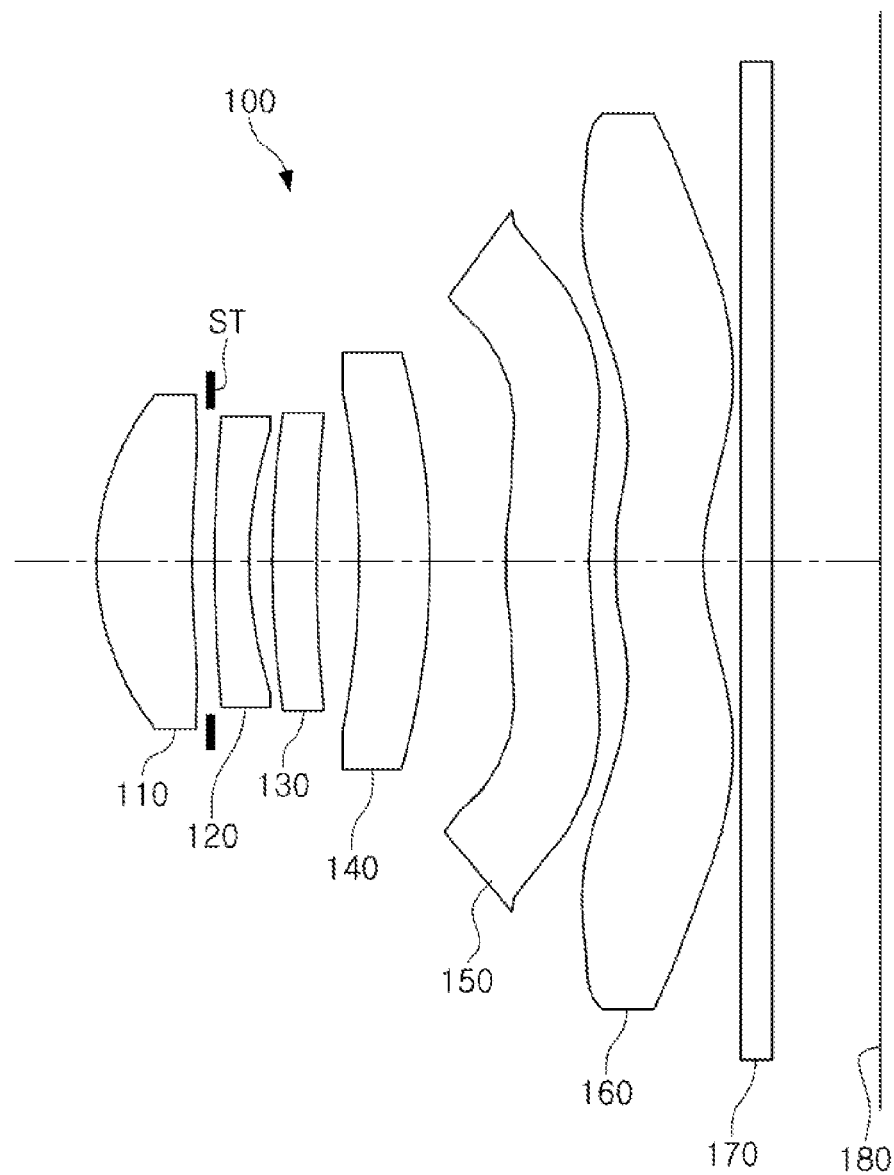
FIG. 1 is a view illustrating an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In accordance with an example, a first lens refers to a lens closest to an object or a subject from which an image is captured. A sixth lens is a lens closest to an imaging plane or an image sensor. In an embodiment, all radii of curvature of lenses, thicknesses, a distance from an object-side surface of a first lens to an imaging plane (OAL), a half diagonal length of the imaging plane (IMG HT), and focal lengths of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

The present disclosure provides an optical imaging system capable of being used in a small camera module while maintaining high performance. Hereinafter, embodiments of the present disclosure will be described in detail with reference to the accompanying drawings. Next, respective lenses will be described in detail.

The first lens has a refractive power. For example, the first lens has a positive refractive power. One surface of the first lens may be convex. In an embodiment, an object-side surface of the first lens is convex. The first lens may have an aspherical surface. For example, both surfaces of the first lens are aspherical.

The first lens may be formed of a material having high light transmissivity and excellent workability. In an example, the first lens is formed of plastic. However, a material of the first lens is not limited to plastic. In another example, the first lens may be formed of glass.

The second lens has a refractive power. For example, the second lens has a negative refractive power. One surface of the second lens may be concave. In an embodiment, an image-side surface of the second lens is concave. The second lens may have an aspherical surface. For example, both surfaces of the second lens are aspherical.

The second lens may be formed of a material having high light transmissivity and excellent workability. In an example, the second lens is formed of plastic. However, a material of the second lens is not limited to plastic. In another example, the second lens may also be formed of glass. The second lens may have an Abbe number lower than that of the first lens. In an embodiment, the Abbe number of the second lens may be 21 or less.

The third lens has a refractive power. For example, the third lens has a positive refractive power. One surface of the third lens may be convex. In an embodiment, an object-side surface of the third lens is convex. The third lens may have an aspherical surface. For example, both surfaces of the third lens are aspherical.

The third lens may be formed of a material having high light transmissivity and excellent workability. In an example, the third lens is formed of plastic. However, a material of the third lens is not limited to plastic. In another example, the third lens may be formed of glass. The third lens may have an Abbe number lower than that of the first lens. In an embodiment, the Abbe number of the third lens is 21 or less.

The fourth lens has a refractive power. For example, the fourth lens has a positive refractive power. One surface of the fourth lens may be concave. In an embodiment, an object-side surface of the fourth lens is concave. The fourth lens may have an aspherical surface. For example, both surfaces of the fourth lens are aspherical.

The fourth lens may be formed of a material having high light transmissivity and excellent workability. In an example, the fourth lens is formed of plastic. However, a material of the fourth lens is not limited to plastic. In another example, the fourth lens may be formed of glass. The fourth lens may have a refractive index lower than that of the third lens. In an embodiment, the refractive index of the fourth lens may be 1.6 or less.

The fifth lens has a refractive power. For example, the fifth lens has a negative refractive power. One surface of the fifth lens may be concave. In an embodiment, an image-side surface of the fifth lens may be concave. The fifth lens may have an aspherical surface. For example, both surfaces of the fifth lens are aspherical. The fifth lens may have inflection points. In embodiments, one or more inflection points are formed on an object-side surface and the image-side surface of the fifth lens.

The fifth lens may be formed of a material having high light transmissivity and excellent workability. In an example, the fifth lens is formed of plastic. However, a material of the fifth lens is not limited to plastic. In another example, the fifth lens may be formed of glass. The fifth lens may have a refractive index higher than that of the fourth lens. In an embodiment, the refractive index of the fifth lens is 1.65 or more.

The sixth lens has a refractive power. For example, the sixth lens has a negative refractive power. One surface of the sixth lens may be concave. In an embodiment, an image-side surface of the sixth lens is concave. The sixth lens may have inflection points. In embodiments, one or more inflection points are formed on both surfaces of the sixth lens. The sixth lens may have an aspherical surface. For example, both surfaces of the sixth lens are aspherical.

The sixth lens may be formed of a material having high light transmissivity and excellent workability. In an example, the sixth lens is formed of plastic. However, a material of the sixth lens is not limited to plastic. In another example, the sixth lens may be formed of glass.

The first to sixth lenses may have an aspherical shape, as described above. As an example, at least one surface of each of the first to sixth lenses is aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$ [Equation 1]

Here, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system may further include a stop. The stop may be disposed between the first lens and the second lens or on the object-side surface of the first lens.

The optical imaging system may further include a filter. The filter may filter partial wavelengths of light from incident light incident through the first to sixth lenses. For example, the filter is configured to filter an infrared wavelength of the incident light.

The optical imaging system may further include an image sensor. The image sensor may provide the imaging plane on which light refracted by the lenses may be imaged. For example, a surface of the image sensor forms the imaging plane. The image sensor may be configured to implement a high level of resolution. For example, the image sensor is configured for a unit size of pixels of 1.12 μm or less.

The optical imaging system may satisfy any one or any combination of any two or more of the following Conditional Expressions:

| | |
|---|---|
| $2ImgHT > 0.7$ mm | [Conditional Expression 1] |
| $TTL/2ImgHT < 0.695$ | [Conditional Expression 2] |
| $S1S5/S1S11 < 0.365$ | [Conditional Expression 3] |
| $R1/f < 0.370$ | [Conditional Expression 4] |
| $30$ mm $< |f6|$ | [Conditional Expression 5] |
| $V2 < 21$ | [Conditional Expression 6] |
| $FNo. < 2.1.$ | [Conditional Expression 7] |

Here, f represents an overall focal length of the optical imaging system, f6 represents a focal length of the sixth lens, V2 represents an Abbe number of the second lens, TTL represents a distance from the object-side surface of the first lens to the imaging plane, 2ImgHT represents the diagonal length of the imaging plane, R1 represents a radius of curvature of the object-side surface of the first lens, S1S5 represents a distance from the object-side surface of the first lens to an image-side surface of the third lens, and S1S11 represents a distance from the object-side surface of the first lens to the image-side surface of the sixth lens.

Next, optical imaging systems according to several examples will be described. First, an optical imaging system according to a first embodiment will be described with reference to FIG. 1. The optical imaging system 100 according to the first example includes lenses having respective refractive powers. For example, optical imaging system 100 includes a first lens 110, a second lens 120, a third lens 130, a fourth lens 140, a fifth lens 150, and a sixth lens 160.

The first lens 110 has a positive refractive power. An object-side surface of lens 110 is convex and an image-side surface of lens 110 is concave. The second lens 120 has a negative refractive power. An object-side surface of lens 120 is convex and an image-side surface of lens 120 is concave. The third lens 130 has a positive refractive power. An object-side surface of lens 130 is convex and an image-side surface of lens 130 is concave. The fourth lens 140 has a positive refractive power. An object-side surface of lens 140 is concave and an image-side surface of lens 140 is convex.

The fifth lens 150 has a negative refractive power. An object-side surface of lens 150 is convex and an image-side surface of lens 150 is concave. In addition, inflection points may be formed on the object-side surface and the image-side surface of fifth lens 150. For example, the object-side surface of fifth lens 150 is convex in a paraxial region, and is concave in the vicinity of the paraxial region. Similarly, the image-side surface of fifth lens 150 is concave in the paraxial region, and is convex in the vicinity of the paraxial region.

The sixth lens 160 has a negative refractive power. An object-side surface of lens 160 is convex and an image-side surface of lens 160 is concave. In addition, inflection points may be formed on both surfaces of sixth lens 160. For example, the object-side surface of sixth lens 160 is convex in the paraxial region, and is concave in the vicinity of the paraxial region. Similarly, the image-side surface of sixth lens 160 is concave in the paraxial region, and is convex in the vicinity of the paraxial region.

Optical imaging system 100 includes a stop ST. For example, stop ST is disposed between first lens 110 and second lens 120. Stop ST disposed as described above controls an amount of light incident to an imaging plane 180.

Optical imaging system 100 includes a filter 170. For example, filter 170 is disposed between sixth lens 160 and imaging plane 180. Filter 170 disposed as described above filters infrared light incident to imaging plane 180.

Optical imaging system 100 includes an image sensor. The image sensor provides imaging plane 180 on which light refracted through the lenses is imaged. In addition, the image sensor may convert an optical signal imaged on imaging plane 180 into an electrical signal. In optical imaging system 100, imaging plane 180 is formed at a significantly large size. For example, a diagonal length of imaging plane 180 is greater than 7 mm. For reference, in an embodiment, the diagonal length (2ImgHT) of imaging plane 180 is 8.136 mm.

Optical imaging system 100 configured as described above has a low F number. For example, the F number of optical imaging system 100 according to an embodiment is 2.04.

Figure 2:
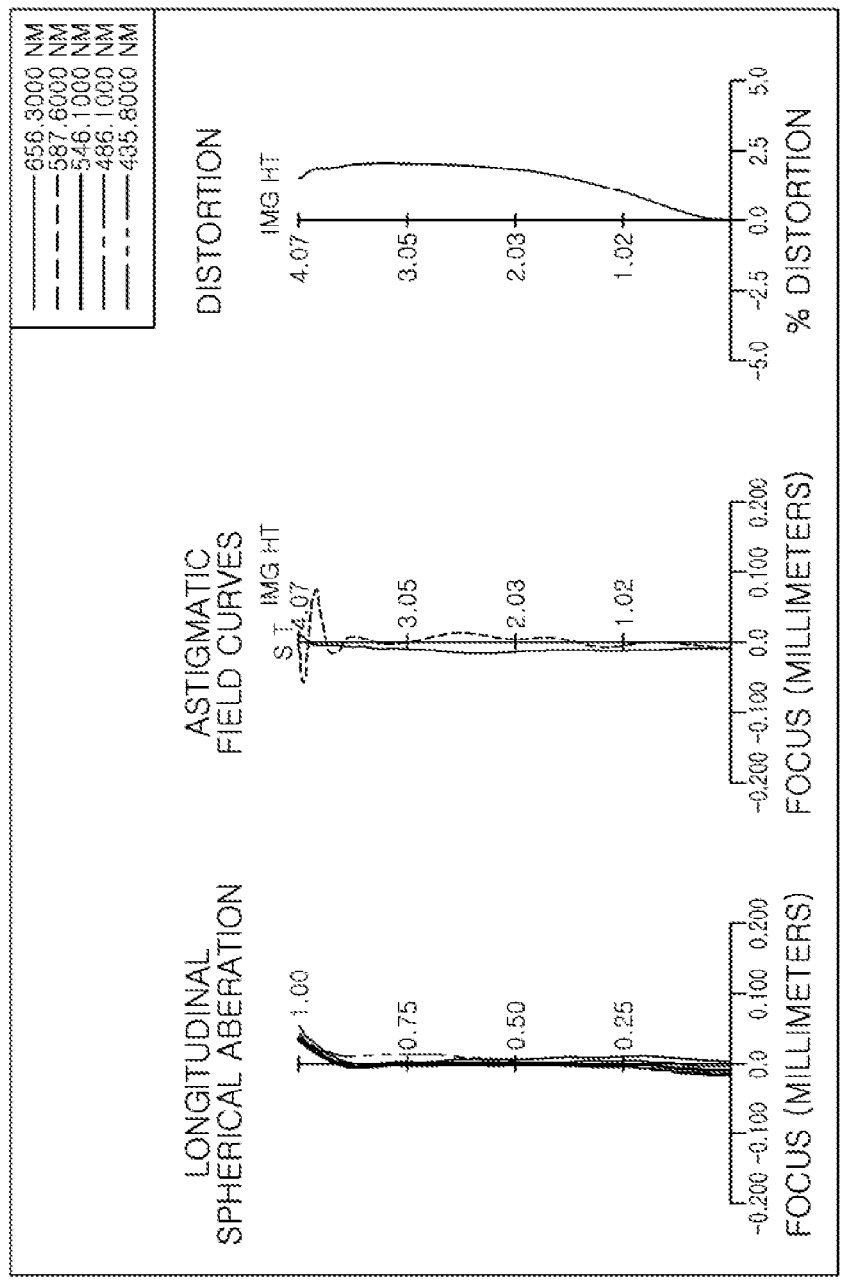
FIG. 2 is a set of graphs representing aberration curves of the optical imaging system illustrated in FIG. 1.

Optical imaging system 100 exhibits aberration characteristics as illustrated by the graphs in FIG. 2. FIG. 3 is a table listing aspherical characteristics of optical imaging system 100. Characteristics of the lenses of optical imaging system 100 are listed in Table 1.

TABLE 1

First Example
F No. = 2.04
FOV = 78.8
f = 4.873 TTL = 5.640

| Surface No. | | Radius of Curvature | Thickness/ Distance | Index | Abbe No. | Focal length |
|---|---|---|---|---|---|---|
| S0 | Stop | | -0.7213 | | | |
| S1 | First Lens | 1.7911 | 0.7208 | 1.546 | 56.11 | 3.825 |
| S2 | | 10.7380 | 0.1384 | | | |
| S3 | Second Lens | 117.3879 | 0.2511 | 1.667 | 20.35 | -6.508 |
| S4 | | 4.1926 | 0.1544 | | | |
| S5 | Third Lens | 3.5007 | 0.3096 | 1.656 | 20.35 | 22.061 |
| S6 | | 4.4527 | 0.3149 | | | |
| S7 | Fourth Lens | -30.8531 | 0.5036 | 1.546 | 56.11 | 35.040 |
| S8 | | -11.8840 | 0.5560 | | | |

TABLE 1-continued

First Example
F No. = 2.04
FOV = 78.8
f = 4.873 TTL = 5.640

| Surface No. | | Radius of Curvature | Thickness/ Distance | Index | Abbe No. | Focal length |
|---|---|---|---|---|---|---|
| S9 | Fifth Lens | 6.7949 | 0.5890 | 1.656 | 20.35 | -19.755 |
| S10 | | 4.3075 | 0.1864 | | | |
| S11 | Sixth Lens | 1.8111 | 0.6362 | 1.536 | 55.66 | -150.296 |
| S12 | | 1.5540 | 0.2795 | | | |
| S13 | Filter | | 0.2100 | 1.518 | 64.17 | |
| S14 | | | 0.7813 | | | |
| S15 | Imaging Plane | | 0.0090 | | | |

Figure 4:
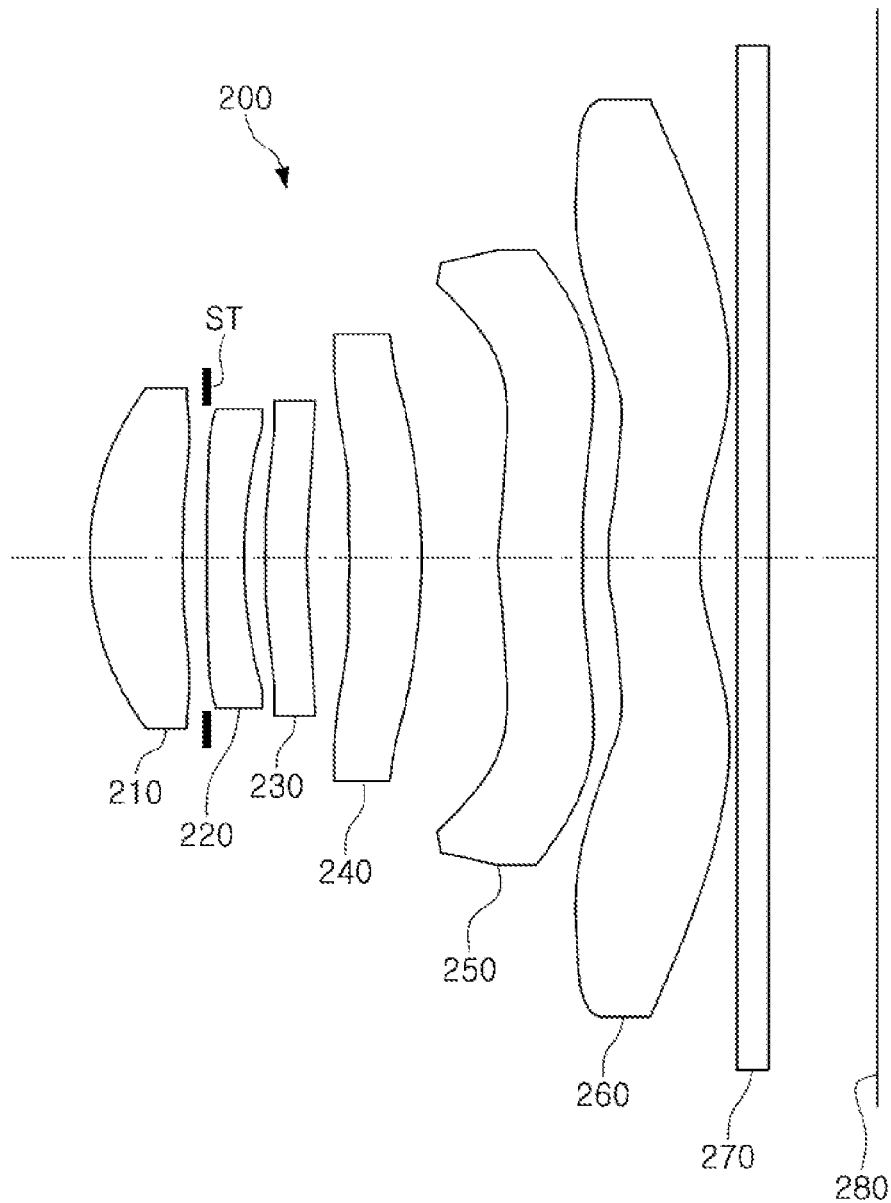
FIG. 4 is a view illustrating an optical imaging system according to a second example.

An optical imaging system according to a second example will be described with reference to FIG. 4. The optical imaging system 200 according to the second embodiment may include lenses having respective refractive powers. For example, optical imaging system 200 includes a first lens 210, a second lens 220, a third lens 230, a fourth lens 240, a fifth lens 250, and a sixth lens 260.

The first lens 210 has a positive refractive power. An object-side surface of lens 210 is convex and an image-side surface of lens 210 is concave. The second lens 220 has a negative refractive power. An object-side surface of lens 220 is convex and an image-side surface of lens 220 is concave. The third lens 230 has a positive refractive power. An object-side surface of lens 230 is convex and an image-side surface of lens 230 is concave. The fourth lens 240 has a positive refractive power. An object-side surface of lens 240 is concave and an image-side surface of lens 240 is convex.

The fifth lens 250 has a negative refractive power. An object-side surface of lens 250 is convex and an image-side surface of lens 250 is concave. In addition, inflection points may be formed on the object-side surface and the image-side surface of fifth lens 250. For example, the object-side surface of fifth lens 250 is convex in a paraxial region, and is concave in the vicinity of the paraxial region. Similarly, the image-side surface of fifth lens 250 is concave in the paraxial region, and is convex in the vicinity of the paraxial region.

The sixth lens 260 has a negative refractive power. An object-side surface of lens 260 is convex and an image-side surface of lens 260 is concave. In addition, inflection points may be formed on both surfaces of sixth lens 260. For example, the object-side surface of sixth lens 260 is convex in the paraxial region, and is concave in the vicinity of the paraxial region. Similarly, the image-side surface of sixth lens 260 is concave in the paraxial region, and is convex in the vicinity of the paraxial region.

Optical imaging system 200 includes a stop ST. For example, stop ST is disposed between first lens 210 and second lens 220. Stop ST disposed as described above controls an amount of light incident to an imaging plane 280.

The optical imaging system 200 includes a filter 270. For example, filter 270 is disposed between sixth lens 260 and imaging plane 280. Filter 270 disposed as described above filters infrared light incident to imaging plane 280.

Optical imaging system 200 may include an image sensor. The image sensor provides imaging plane 280 on which light refracted through the lenses is imaged. In addition, the image sensor may convert an optical signal imaged on imaging plane 280 into an electrical signal. In an embodiment, imaging plane 280 may be formed at a significantly large size. For example, a diagonal length of imaging plane 280 is greater than 7 mm. For reference, in the described embodiment, the diagonal length (2ImgHT) of imaging plane 280 is 8.136 mm.

The optical imaging system 200 configured as described above may have a low F number. For example, the F number. of the optical imaging system according to the described embodiment is 2.04.

Figure 5:
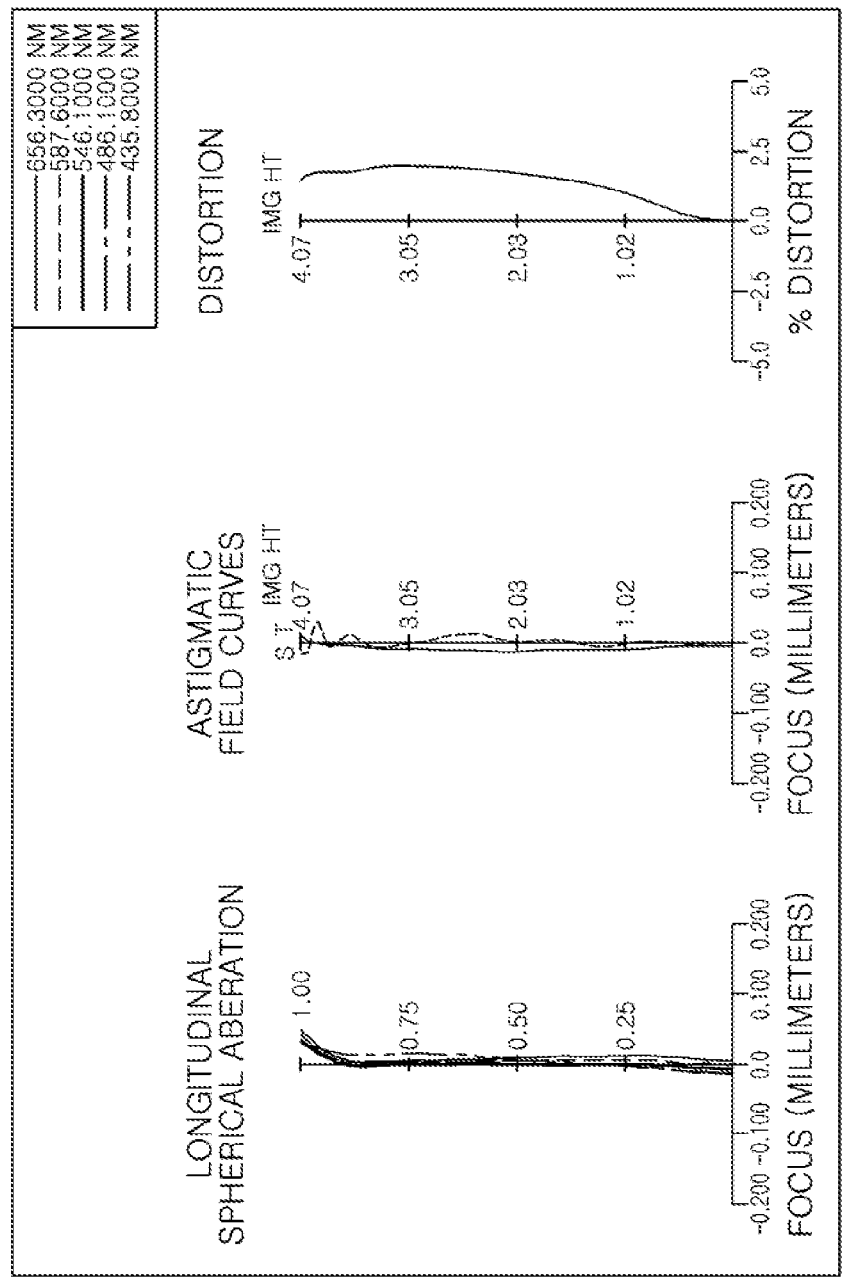
FIG. 5 is a set of graphs representing aberration curves of the optical imaging system illustrated in FIG. 4.

The optical imaging system according to an embodiment exhibits aberration characteristics as illustrated by the graphs in FIG. 5. FIG. 6 is a table listing aspherical characteristics of optical imaging system 200. Characteristics of the lenses of optical imaging system 200 are listed in Table 2.

TABLE 2

Second Example
F No. = 2.04
FOV = 78.8
f = 4.873 TTL = 5.640

| Surface No. | | Radius of Curvature | Thickness/ Distance | Index | Abbe No. | Focal length |
|---|---|---|---|---|---|---|
| S0 | Stop | −0.7210 | | | | |
| S1 | First Lens | 1.7893 | 0.7159 | 1.546 | 56.11 | 3.815 |
| S2 | | 10.8443 | 0.1390 | | | |
| S3 | Second Lens | 240.9604 | 0.2461 | 1.667 | 20.35 | −6.578 |
| S4 | | 4.3181 | 0.1533 | | | |
| S5 | Third Lens | 3.5966 | 0.2990 | 1.656 | 20.35 | 22.924 |
| S6 | | 4.5682 | 0.3077 | | | |
| S7 | Fourth Lens | −23.2767 | 0.5075 | 1.546 | 56.11 | 34.250 |
| S8 | | −10.4548 | 0.5725 | | | |
| S9 | Fifth Lens | 6.9081 | 0.5927 | 1.656 | 20.35 | −22.182 |
| S10 | | 4.5280 | 0.1854 | | | |
| S11 | Sixth Lens | 1.8469 | 0.6366 | 1.536 | 55.66 | −65.986 |
| S12 | | 1.5440 | 0.3200 | | | |
| S13 | Filter | | 0.2100 | 1.518 | 64.17 | |
| S14 | | | 0.7457 | | | |
| S15 | Imaging Plane | | 0.0086 | | | |

Figure 7:
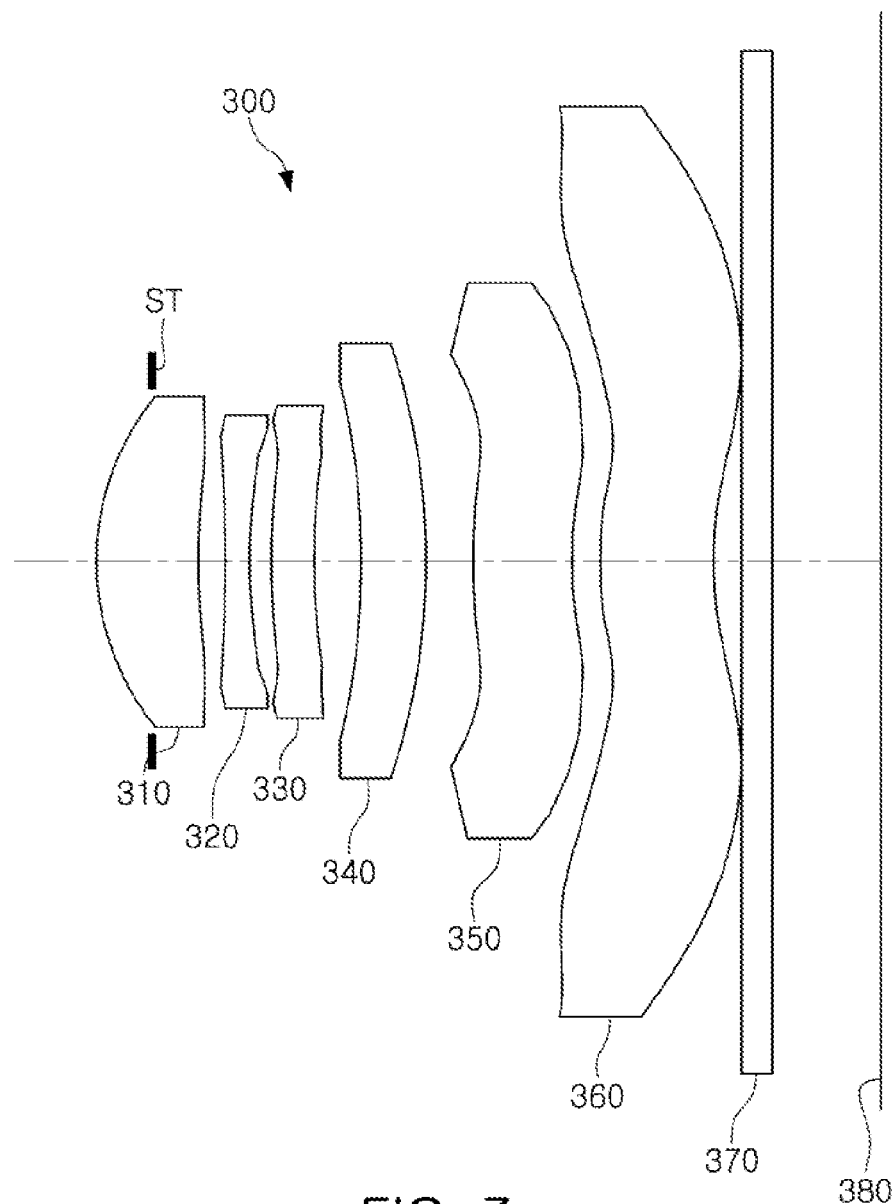
FIG. 7 is a view illustrating an optical imaging system according to a third example.

An optical imaging system according to a third example will be described with reference to FIG. 7. The optical imaging system 300 according to the embodiment includes lenses having respective refractive powers. For example, optical imaging system 300 includes a first lens 310, a second lens 320, a third lens 330, a fourth lens 340, a fifth lens 350, and a sixth lens 360.

The first lens 310 has a positive refractive power. An object-side surface of lens 310 is convex and an image-side surface of lens 310 is concave. The second lens 320 has a negative refractive power. Both surfaces of lens 320 are concave. The third lens 330 has a positive refractive power. An object-side surface of lens 330 is convex and an image-side surface of lens 330 is concave. The fourth lens 340 has a positive refractive power. An object-side surface of lens 340 is concave and an image-side surface of lens 340 is convex.

The fifth lens 350 has a negative refractive power. An object-side surface of lens 350 is convex and an image-side surface of lens 350 is concave. In addition, inflection points may be formed on the object-side surface and the image-side surface of fifth lens 350. For example, the object-side surface of fifth lens 350 is convex in a paraxial region, and is concave in the vicinity of the paraxial region. Similarly, the image-side surface of fifth lens 350 is concave in the paraxial region, and is convex in the vicinity of the paraxial region.

The sixth lens 360 has a negative refractive power. An object-side surface of lens 360 is convex and an image-side surface of lens 360 is concave. In addition, inflection points may be formed on both surfaces of sixth lens 360. For example, the object-side surface of sixth lens 360 is convex in the paraxial region, and is concave in the vicinity of the paraxial region. Similarly, the image-side surface of sixth lens 360 is concave in the paraxial region, and is convex in the vicinity of the paraxial region.

Optical imaging system 300 includes a stop ST. For example, Stop ST is disposed on the object-side surface of first lens 310. Stop ST disposed as described above controls an amount of light incident to an imaging plane 380.

Optical imaging system 300 includes a filter 370. For example, filter 370 is disposed between sixth lens 360 and imaging plane 380. Filter 370 disposed as described above filters infrared light incident to imaging plane 380.

Optical imaging system 300 includes an image sensor. The image sensor provides imaging plane 380 on which light refracted through the lenses is imaged. In addition, the image sensor may convert an optical signal imaged on imaging plane 380 into an electrical signal. In an embodiment, imaging plane 380 is formed at a significantly large size. For example, a diagonal length of the imaging plane 380 is greater than 7 mm. For reference, in optical imaging system 300, the diagonal length (2ImgHT) of imaging plane 380 is 8.136 mm.

Optical imaging system 300 configured as described above may have low F number. For example, the F number of optical imaging system 300 according to an embodiment is 2.08.

Figure 8:
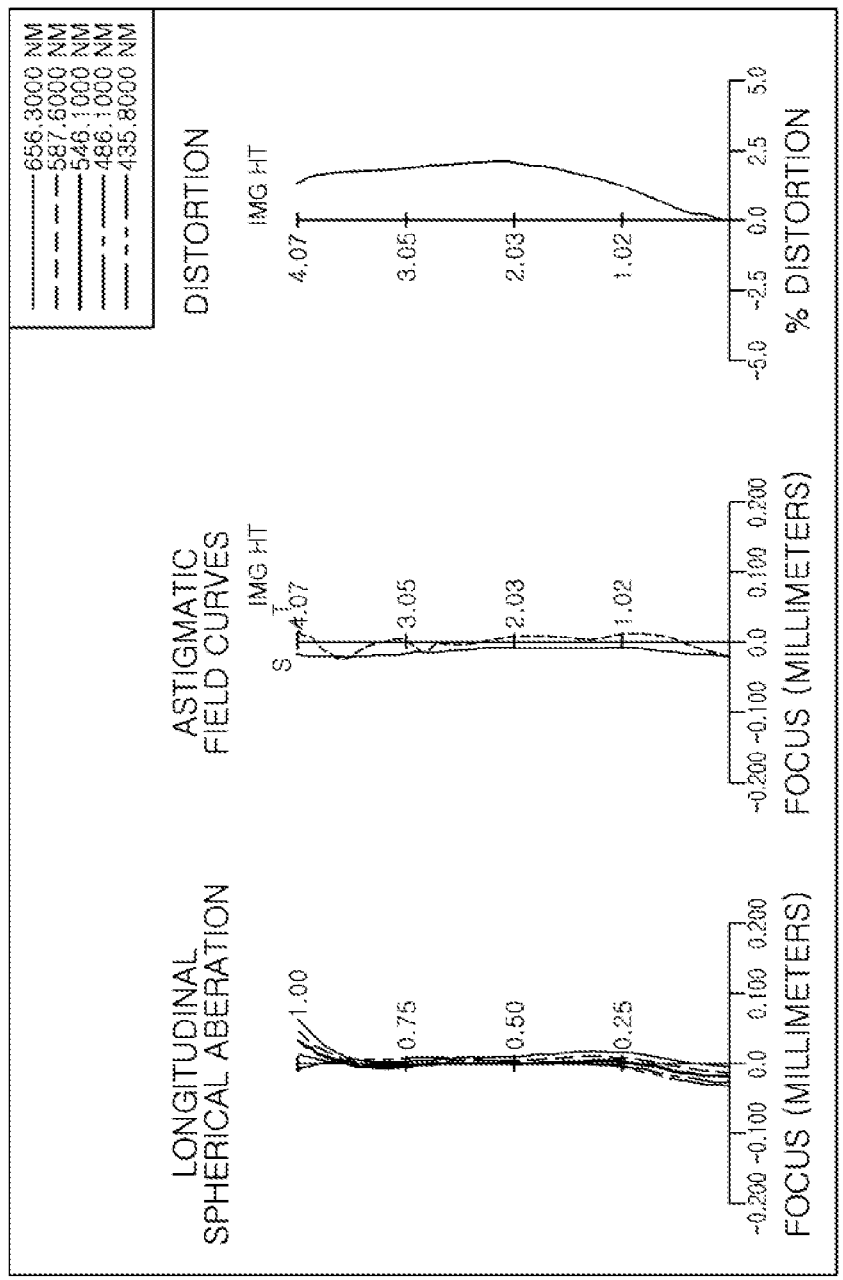
FIG. 8 is a set of graphs representing aberration curves of the optical imaging system illustrated in FIG. 7.

Optical imaging system 300 exhibits aberration characteristics as illustrated by the graphs in FIG. 8. FIG. 9 is a table listing aspherical characteristics of the optical imaging system according to an embodiment. Characteristics of the lenses of optical imaging system 300 are listed in Table 3.

TABLE 3

Third Example
F No. = 2.08
FOV = 78.8
f = 4.874 TTL = 5.622

| Surface No. | | Radius of Curvature | Thickness/ Distance | Index | Abbe No. | Focal length |
|---|---|---|---|---|---|---|
| S0 | Stop | | −0.4221 | | | |
| S1 | First Lens | 1.6967 | 0.7664 | 1.546 | 56.11 | 3.660 |
| S2 | | 9.3957 | 0.1052 | | | |
| S3 | Second Lens | −17.4231 | 0.2307 | 1.667 | 20.35 | −7.478 |
| S4 | | 7.0505 | 0.1466 | | | |
| S5 | Third Lens | 4.3247 | 0.3351 | 1.656 | 20.35 | 23.011 |
| S6 | | 5.8699 | 0.3023 | | | |
| S7 | Fourth Lens | −28.9448 | 0.4570 | 1.546 | 56.11 | 194.468 |
| S8 | | −22.8760 | 0.4661 | | | |
| S9 | Fifth Lens | 104.5584 | 0.6603 | 1.656 | 20.35 | −20.989 |
| S10 | | 12.1587 | 0.1362 | | | |
| S11 | Sixth Lens | 2.4000 | 0.8006 | 1.536 | 55.66 | −33.521 |
| S12 | | 1.8708 | 0.2100 | | | |
| S13 | Filter | | 0.2100 | 1.518 | 64.17 | |
| S14 | | | 0.7757 | | | |

TABLE 3-continued

Third Example
F No. = 2.08
FOV = 78.8
f = 4.874 TTL = 5.622

| Surface No. | Radius of Curvature | Thickness/ Distance | Index | Abbe No. | Focal length |
|---|---|---|---|---|---|
| S15 | Imaging Plane | 0.0200 | | | |

Table 4 lists values of Conditional Expressions of the optical imaging systems according to the first to third examples. As seen in Table 4, optical imaging systems 100, 200 and 300 satisfy all of the numerical ranges of the Conditional Expressions disclosed in the detailed description of the present application.

TABLE 4

| Conditional Expression | 1st Example | 2nd Example | 3rd Example |
|---|---|---|---|
| TTL/2ImgHT | 0.6932 | 0.6932 | 0.6910 |
| S1S5/S1S11 | 0.3610 | 0.3566 | 0.3595 |
| R1/f | 0.3676 | 0.3672 | 0.3481 |
| |f6| | 150.296 | 65.986 | 33.521 |
| V2 | 20.3532 | 20.3532 | 20.3532 |

As set forth above, according to the embodiments in the present disclosure, an optical imaging system can be implemented that is appropriate for a small camera module while still having high performance.

While embodiments have been shown and described above, it will be apparent to those skilled in the art that modifications and variations could be made without departing from the scope of the present application as defined by the appended claims.

What is claimed is:

1. An optical imaging system comprising:
a first lens, a second lens, a third lens, a fourth lens, a fifth lens, and a sixth lens sequentially disposed from an object side to an imaging plane,
wherein the third lens comprises a positive refractive power,
wherein the fifth lens comprises a negative refractive power,
wherein TTL/2ImgHT<0.695 in which TTL represents a distance from an object-side surface of a lens closest to the object side among the plurality of lenses to an imaging plane and 2ImgHT represents a diagonal length of an imaging plane, and
wherein the optical imaging system has a total number of six lenses with refractive power.

2. The optical imaging system of claim 1, wherein 7.0 millimeters (mm)<2ImgHT.

3. The optical imaging system of claim 1, wherein an F number of the optical imaging system is less than 2.1.

* * * * *